United States Patent
Vleugels et al.

(10) Patent No.: US 9,198,115 B2
(45) Date of Patent: *Nov. 24, 2015

(54) METHOD AND APPARATUS FOR SCANNING AND DEVICE DETECTION IN A COMMUNICATION SYSTEM

(71) Applicant: Atmel Corporation, San Jose, CA (US)

(72) Inventors: Katelijn Vleugels, San Carlos, CA (US); Barry Thompson, Menlo Park, CA (US); Nils Bunger, Mountain View, CA (US); Ilya Minkin, Los Altos, CA (US)

(73) Assignee: Atmel Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/473,631

(22) Filed: Aug. 29, 2014

(65) Prior Publication Data

US 2014/0369234 A1  Dec. 18, 2014

Related U.S. Application Data

(63) Continuation of application No. 11/423,202, filed on Jun. 9, 2006, now Pat. No. 8,848,730, which is a continuation of application No. 11/376,708, filed on Mar. 14, 2006, now abandoned.

(60) Provisional application No. 60/735,935, filed on Nov. 10, 2005.

(51) Int. Cl.
*H04B 7/212* (2006.01)
*H04W 48/14* (2009.01)
*H04W 76/02* (2009.01)
*H04W 8/00* (2009.01)

(52) U.S. Cl.
CPC .............. *H04W 48/14* (2013.01); *H04W 8/005* (2013.01); *H04W 76/02* (2013.01)

(58) Field of Classification Search
CPC ................ H04L 12/413; H04L 12/403; H04L 12/40143; H04W 74/0816; H04W 74/02; H04W 74/002; H04W 74/04; H04W 74/08
USPC ......... 370/304, 322, 329, 341, 348, 431, 439, 370/443, 447, 461, 503; 455/450, 464, 509
See application file for complete search history.

(56) References Cited

U.S. PATENT DOCUMENTS

| | | |
|---|---|---|
| 5,719,859 A | 2/1998 | Kobayashi et al. |
| 6,353,734 B1 | 3/2002 | Wright et al. |
| 6,895,255 B1 * | 5/2005 | Bridgelall .................. 455/552.1 |

(Continued)

*Primary Examiner* — Mang Yeung
(74) *Attorney, Agent, or Firm* — Fish & Richardson P.C.

(57) ABSTRACT

In a communication system wherein a plurality of electronic devices connect and disconnect from communication over a medium and wherein the communication system has a protocol such that it is followed by the plurality of electronic devices when using the communication system, a probing device attempts to detect presence of a listening device and parameters associated with a connection to be set up between the probing device and the listening device by sending a probe request packet directed to the listening device and sending, from the listening device, a probe response packet in response to the probe request packet, wherein the listening device bypasses at least one step of the protocol when sending the probe response packet. The bypassed step might be medium arbitration, the communication system might be a wireless network fully or partially based on an 802.11x specification, or a wireless network that uses 802.11x frame formatting and/or modifications/extensions thereof.

20 Claims, 9 Drawing Sheets

(56) References Cited

U.S. PATENT DOCUMENTS

| | | |
|---|---|---|
| 7,382,758 B2 | 6/2008 | Silverman et al. |
| 7,522,049 B2 | 4/2009 | Aljadeff et al. |
| 2002/0101882 A1 | 8/2002 | Kim |
| 2003/0051170 A1* | 3/2003 | Spearman ............... 713/201 |
| 2004/0039817 A1 | 2/2004 | Lee et al. |
| 2005/0063334 A1 | 3/2005 | Fnu et al. |
| 2005/0254513 A1 | 11/2005 | Cave et al. |
| 2006/0111103 A1 | 5/2006 | Jeong et al. |
| 2011/0096856 A1 | 4/2011 | Sadowsky et al. |

* cited by examiner

METHOD AND APPARATUS FOR SCANNING AND DEVICE DETECTION IN A COMMUNICATION SYSTEM

CROSS-REFERENCES TO RELATED APPLICATIONS

This application is a continuation of U.S. patent application Ser. No. 11/423,202 filed Jun. 9, 2006, which is a continuation of U.S. patent application Ser. No. 11/376,708 filed Mar. 14, 2006, which claims the benefit of and is a non-provisional of U.S. Patent Application Ser. No. 60/735,935 filed on Nov. 10, 2005, which is incorporated by reference in its entirety for all purposes.

FIELD OF THE INVENTION

The present invention relates to electronic devices that communicate using a communication system in general and more particularly to a communication system wherein the electronic devices need to determine what other electronic devices are present in the communication system.

BACKGROUND OF THE INVENTION

Wireless communication among electronic devices has been increasing as the benefits and conveniences of wireless communication become more preferred. A wireless communication system or wireless network is often described as containing nodes (or more precisely, circuitry associated with the concept of a node) and a wireless medium (WM) over which the nodes' circuitry communicate to convey information. Where some action or activity is described as happening at (or being done at) a node, it should be understood that the electronic device and/or network interface that is at (or simply is) the node is the circuitry that is performing the action or activity. For example, sending data from node A to node B means transmitting a signal from circuitry associated with node A and receiving that signal (or more precisely, the transmitted signal modified by the medium) using circuitry associated with node B.

The information conveyed between nodes can be digital data and digitized analog signals, or other forms of information, but communication system design often assumes that digital data is being conveyed and higher network layers interpret the data appropriately. For purposes herein, it is assumed that data exists at one node, is provided to lower network layers, is conveyed to another node over a WM, is received by another node correctly or incorrectly and then is conveyed to upper network layers at the receiver. In one model, two networked devices run applications that pass data between themselves by having the sending device's application convey data to an application layer of a network stack, which conveys data to lower levels, ultimately to a medium access control (MAC) layer and a physical network (PHY) layer, and the process is inverted at the recipient.

To set up a wireless network, all that is needed is a plurality of electronic "node" devices capable of transmitting and receiving data in a manner understood by the two (or more) nodes involved in a conversation, with the node devices appropriately placed such that they can communicate in the medium that exists between the devices. The medium could be some type of dielectric material, but more commonly, the medium is the air space and objects (walls, chairs, books, glass. etc.) that are between devices or are positioned such that they have an effect on the signals transmitted between devices. Presumably, the node devices are assigned unique identifiers to distinguish transmissions, but this might not always be necessary. Examples of such unique identifiers are MAC addresses and IP addresses.

As the existence of various wireless media and their properties are known and are not the focus of this disclosure, the medium is often just shown in the attached figures as a cloud. Thus, it should be understood that supplier of a set of two or more powered devices that can communicate supplies a wireless network; the wireless medium is presumed.

In some networks, one of the node's device is the controller for the network and the other devices are followers. For example, in an 802.11x network operating in infrastructure mode, one of the nodes is an "access point" (AP) and the other nodes are stations ("STAs"). In some networks, such as personal area network or "PAN", the controller is a computing device and the other nodes are peripherals associated with that computing device.

In general, a wireless connection between two or more devices requires that each device include wireless network circuitry for conveying signals over the medium and receiving signals over the medium, as well as processing/communication circuitry to receive, process and/or convey data and/or signals to that wireless network circuitry. The processing/communication circuitry could be implemented with actual circuits, software instructions executable by a processor, or some combination thereof. In some variations, the wireless network circuitry and processing/communication circuitry are integrated (such as with some PDAs, wireless mice, etc.) or are separate elements (such as a laptop as the processing/communication circuitry and a network PCMCIA card as the wireless network circuitry).

For ease of understanding this disclosure, where it is important to make the distinction between devices, a device that exists to provide wireless connectivity is referred to as a "network interface", "network interface device", "wireless network interface device" or the like, while the device for which the wireless connectivity is being provided is referred to as a "computing device" or an "electronic device" notwithstanding the fact that some such devices do more than just compute or might not be thought of as devices that do actual computing and further notwithstanding the fact that some network interface devices themselves have electronics and do computing. Some electronic devices compute and communicate via an attached network interface device while other electronic devices might have their network interface devices integrated in a non-detachable form. Where an electronic device is coupled to a wireless network interface to a wireless network, it is said that the device is a node in the network and thus that device is a "node device".

A communication system provides for transfers of data and messages between devices, such as device-to-device transfers and broadcast transfers. Where the communication system is used by a number of electronic devices wherein the number and/or set of electronic devices that are coupled to the communications system at any given time is not known to each of the electronic devices, such electronic devices may need to have a mechanism for discovering which electronic devices are presently coupled to the communications system or at least whether a particular electronic device is presently coupled to the communications system.

An "initiating device" is an electronic device coupled to the communications system that desires to exchange information, data and/or signals with another electronic device, herein referred to as a "destination device". As part of the exchange process, the two devices first form a "connection". A connection might be set up using operations such as device detection, negotiation and/or exchange of specific communication parameters and/or security information, and initiation of a synchronization procedure.

The communication system might use "channels" to convey signals, wherein signals flow over a plurality of channels and are assumed to be separate signals, even though they might be combined in transit. For example, a communication system might include a signal transmission medium that is divided into a plurality of channels by time division, frequency division, division by protocol, encoding scheme and/or data rate, etc., or a combination of some or all of the above and other channel definition criteria.

Device detection by an initiating device typically involves a scanning operation to locate the channel of the destination device. As an example, if the initiating device does not know which of a plurality of time slots is associated with the destination device such that the destination device can be "found" in that associated time slot, the initiating device might scan over a number of time slots looking for the destination device (i.e., attempting to detect its presence so that a connection could be established). The destination device may, for example, be unavailable during certain periods of time because it has powered down parts or all of its circuits, or because it is communicating with one or more electronic devices other than the initiating device. Such other devices may or may not be part of the same communication system as the initiating device. As another example, detection in frequency may be necessary if the frequency of operation of the destination device is not a priori known by the initiating device.

In many applications, it is desirable that device detection happens sufficiently fast such that no significant delay is added to the connection process. This may, for example, be important in latency-sensitive applications where noticeable delays degrade the user experience and/or the performance of the network. An example of a latency-sensitive communication system is a communication system over which a personal computer (PC) and a wireless mouse might communicate.

In such a system, a user moves the mouse, the mouse connects with the PC, communicates messages indicating the movement, the PC receives the message and interprets it, and then the PC's applications show the appropriate response to the movement (e.g., moving a cursor, selecting an item). Typically, none of the system components can predict when a user will start to move a mouse that has been sitting motionless, but the user will expect that the application respond in apparently real-time (i.e., without noticeable delay, undesirable delay, or both). For this to occur, the PC and mouse must maintain a constant connection to be ready when the unpredictable mouse movement occurs or must be able to set up a connection quickly when the unpredictable mouse movement does occur. In the former case, considerable power might be expended maintaining the connection during periods of inactivity, which would be wasteful.

In many applications, it is important that device detection be implemented in a power efficient way. This is particularly important when the initiating device and/or destination device are battery operated devices. As an example, when the communication system comprises a cellular phone as a destination device and a cordless headset as an initiating device, device detection should not significantly impact the battery life of either the phone or the headset.

Different scanning mechanisms exist and may be used for device detection. They typically comprise one device, herein referred to as the "probing" device, actively sending packets, herein referred to as "probe request packets", and one or multiple other devices, herein referred to as the "listening" devices, passively listening for probe request packets from a probing device. Since the probing device might not a priori know which and how many listening devices may be listening at a given moment in time, the probing packet is usually constructed in such a way that it is addressed to all listening devices. As an example, if the communication system is a wireless Local Area Network (WLAN) based on one or more of the 802.11 specifications (such as 802.11a, .11b, .11e, .11g, .11n, etc.; referred to herein as "an 802.11 network" or "an 802.11x network"), then the probe request packet is typically built as a broadcast frame.

When a listening device successfully receives a probe request packet, it may respond with a response packet, herein referred to as "probe response packet". Since there may be multiple listening devices that may be receiving the same probe request packet, a device that desires to send a probe response packet must follow normal frame transmission rules, including regular medium access procedures, in order to prevent collisions and interference on the medium.

A significant delay, herein referred to as the "probe response time", may exist between a probe request packet being transmitted and a corresponding probe response packet being received due to delay needed for the listening device to perform its medium access procedures.

In some scan methods, the probe response time can be long and can vary widely depending among other things on the medium occupancy. As an example, in a contention-based communication system, like an 802.11-based Carrier-Sense-Multiple-Access based system with collision-avoidance (CSMA/CA), the probe response time may be increased significantly and may vary because of medium arbitration in the presence of other traffic on the medium.

Long and variable probe response times are undesirable in specific applications, as they can significantly increase the power consumption in the initiating and/or destination device and can degrade the connection time. One reason for this is that variable probe response times require the probing device to have its receiver circuitry powered up for a period longer than is needed for the actual reception, because the probing device does not know when the transmission will occur.

This is especially true when probing devices may be probing for listening devices that may or may not be available on the channel where the probing takes place. Indeed, in order to make sure that no probe response packet is missed, a device that has transmitted a probe request packet should wait and listen for a probe response packet for at least the worst case probe response time, if this time can be defined deterministically. Alternatively, the device should wait and listen for a sufficiently long amount of time after sending a probe request packet to statistically ensure that the chance of missing a probe response packet is acceptably small.

In an 802.11x network, specific medium reservation schemes are sometimes used for regular data communication between two connected devices. In such schemes, a first device reserves the medium for a packet that will be transmitted by a second device that is connected to the first device. Such a medium reservation scheme makes it possible to exchange packets between two connected devices without causing collisions or interference on the medium, while bypassing some or all of the normal frame transmission rules or regular medium access procedures.

A medium reservation scheme as described above may be useful for achieving a more reliable data exchange between two or more devices if not all devices do have a communication path to all other devices that are sharing the same communication channel, if one or more devices does not implement the functionality required to make a correct and fair decision about when to access the medium, if not all devices have access to all the information about other devices to be able to make a correct or fair decision about when to access the medium, or for any combination of the above and other reasons.

A common medium reservation system used to increase the reliability of data exchange in 802.11x networks operating in an "infrastructure mode" is a message exchange comprising a Ready-To-Send (RTS) message from a first device, typically a station ("STA") that is not an access point ("AP"), and a Clear-To-Send (CTS) message from a second device, typically the AP. Prior to sending a packet, a STA may decide to first send an RTS packet to request a medium reservation for its pending packet. The medium reservation in the RTS packet typically includes the time required for the transmission of the pending packet, a CTS packet, possibly an acknowledgement and one or more turnaround intervals (e.g., three Short Interframe Spaces or "SIFS"). The AP receiving the RTS responds with a CTS packet without incurring the delay that may be introduced when following the regular frame transmission rules and regular medium access procedures. The medium reservation in the CTS packet is typically computed from the medium reservation request in the immediately previous RTS packet by subtracting the time required to send a CTS packet and the appropriate turnaround time (e.g., one SIFS). Upon reception of the CTS packet, the device that initiated the RTS/CTS packet exchange may go ahead and transmit its pending frame without incurring delays that may be introduced by following regular medium access procedures.

Another example of a medium reservation mechanism is the controlled channel access mechanism (or "HCCA") that may be used for periodic high Quality of Service (QoS) traffic in 802.11(e) based infrastructure networks. In such networks, an AP may set up a Traffic Stream (TS) with a non-AP station (STA), and may periodically communicate with the non-AP STA based on the parameters negotiated/specified for the traffic stream. In that case, the communication between an AP and a non-AP STA comprises a poll frame transmitted by the AP and directed to the non-AP STA followed by a poll response frame transmitted by the non-AP STA and directed to the AP. The poll frame reserves the medium for the subsequent poll response frame, thereby allowing the non-AP STA to bypass the normal transmission rules and respond within a considerably shorter response time.

While the medium reservation schemes like the ones described above have been used successfully to increase the reliability and/or Quality-of-Service performance of regular data communication between two connected devices, such schemes assume that both devices have successfully established a connection prior to adopting the schemes for data communication.

In addition, both schemes are used specifically in the context of 802.11x networks that operate in infrastructure mode, where the device making the medium reservation is an Access Point, and not a regular non-AP STA.

What is needed is an improved connection process that does not require a prior connection and provides acceptably low latency.

In light of the above, improved device detection protocols, methods and apparatus are proposed.

BRIEF SUMMARY OF THE INVENTION

In embodiments of a system and processes, scanning for device detection in communication systems where long and/or variable probe response times are not desirable is performed with low latency where a probing device scans for the presence of a known listening device where the channel of the listening device may or may not be known to the probing device. While such information might not be known, the probing device typically maintains some fundamental parameters required to establish a connection between an initiating device and a destination device that might have been exchanged during a "pairing" operation that occurred prior to a connection operation, if needed. Examples of fundamental parameters include address information of both devices or the identification of the communication system that comprises both devices.

Upon successful reception of a probe request packet from a probing device, a listening device responds with a probe response packet within the fastest possible response time or within the fastest response time that is acceptable within the communication system. Alternatively, different response times may also be used, but in any case, the listening device may bypass some or all of the regular medium access procedures, and as such may decrease the overall probe response time and possibly reduce its timing uncertainty.

Devices might use a medium reservation scheme to reduce the probe response time. Devices might include a wireless mouse, wireless headset and/or other wireless peripheral and/or other sensing device. A probing device is typically an initiating device, but there may be cases where a destination device does the probing.

Disclosed methods have additional advantages in that they may be used in communication systems that deploy an asymmetric reservation scheme.

Other objects, features, and advantages of the present invention will become apparent upon consideration of the following detailed description and the accompanying drawings, in which like reference designations represent like features throughout the figures.

DESCRIPTION OF THE INVENTION

Figure 1:
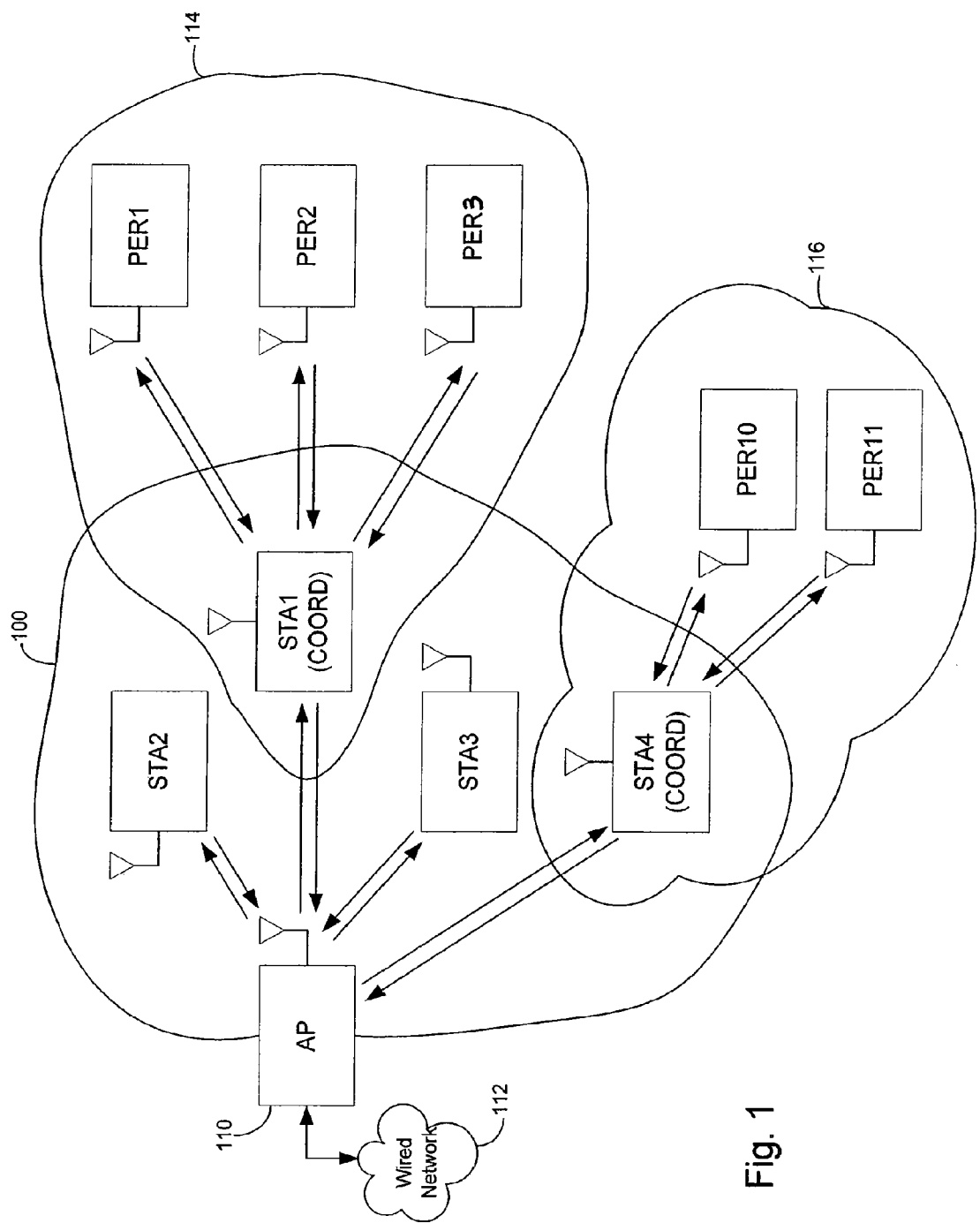
FIG. 1 is a block diagram illustrating various devices operating as part of a primary wireless network (PWN), a secondary wireless network (SWN), or both, wherein the SWN operates using an SWN protocol that co-exists with the PWN protocol.

In the general example, a computing device is a portable and/or mobile computing and/or communications device with some computing capability. Examples of computing devices include laptop computers, desktop computers, handheld computing devices, pagers, cellular telephones, devices with embedded communications abilities and the like. Examples of peripheral devices include typical computer, telephone etc. accessories where wireless connections are desired, but might also include less common devices, such as wearable devices that communicate with other devices on a person or even to communicate with other nearby devices, possibly using the electrical conductivity of the human body as a data network. For example, two people could exchange information between their wearable computers without wires, by transmission through the air, or using their bodies and/or clothing.

The computing devices may interface to 802.11 WLANs or other wireless networks to communicate with other network nodes, including nodes accessible through wired connections to the wireless network (typically via an access point). The computing devices also may interface to PAN devices over a personal area network (PAN), such as wireless headsets, mice, keyboards, accessories, recorders, telephones and the like. A wide variety of PAN devices are contemplated that are adapted for short-range wireless communications, typically bi-directional and typically low power so as to conserve a PAN device's limited power source. Some PAN devices might be unidirectional, either receive-only or transmit-only, devices.

In a specific embodiment of the invention, a computing device like a laptop computer has a wireless module and/or interface that serves as the wireless device coordinating a wireless PAN and is referred to as the coordinator ("COORD"). A wireless peripheral like a mouse, might be able to be a PAN device. Herein, a peripheral or PAN node will be referred to as "PER". Multiple PERs can connect to a single wireless PAN. It should be understood that examples herein that refer to COORD, PER and PAN might be applicable outside the realm of a PAN and apply more generally.

While not always required, the PERs are power-sensitive devices. It should be understood that an object labeled "PER" need not be a peripheral in the sense of an object with a purpose to serve a particular purpose, but rather an object that performs the behaviors herein referred to as behaviors of a PAN node. For example, a printer can be a PER when it is connected to a desktop computer via a PAN, but some other device not normally thought of as a peripheral can be a PER if it behaves as one.

Examples of the concepts and disclosures provided above will now be further explained with reference to the figures. In the figures, like items are referenced with a common reference number with parenthetical numbers to indicate different instances of the same or similar objects. Where the number of instances is not important for understanding the invention, the highest parenthetical number might be a letter, such as in "100(1), 100(2), . . . , 100(N)". Unless otherwise indicated, the actual number of items can differ without departing from the scope of this disclosure.

Specifically, FIG. 1 illustrates various devices operating as part of a primary wireless network (PWN) 100, a secondary wireless network (SWN) (such as 114 or 116), or both. In the figure, an access point (AP) 110 supports an infrastructure mode for PWN 100, coupling various stations to the network allowing, for example, network traffic between a station and a wired network 112. By communicating with the AP, a station can retrieve information from the Internet and exchange data with other stations that may or may not be part of the Basic Service Set (BSS) managed by the AP. While this example shows two networks, it should be clear that the present invention is operable where only one network is present and devices need to discover each other.

As shown in the example, the stations present are STA1, STA2, STA3 and STA4. Each station is associated with a node in PWN 100 and has the necessary hardware, logic, power, etc. to be a node device in PWN 100. Station STA1 also coordinates SWN 114 as the COORD for that network shown comprising PER1, PER2 and PER3. Likewise, station STA4 coordinates SWN 116 as the COORD for the network comprising STA4, PER10 and PER11. A device that is a STA in a PWN and a COORD in a SWN is herein referred to as a dual-net device. In FIG. 1, each node device is shown with an antenna to indicate that it can communicate wirelessly, but it should be understood that an external antenna is not required.

Other network components and additional instances might also be present.

For example, more than one AP might be present, there might be overlaps of BSSes and other network topologies might be used instead of the exact one shown in FIG. 1 without departing from the scope of the invention. Examples used herein for PWN 100 include 802.11x (x=a, b, g, n, etc.), but it should be understood that the primary wireless network may well be another network selected among those in present use or available when the primary wireless network is implemented.

In this example, the secondary wireless networks are assumed to be used for PAN functionality. The PAN can be used for, but is not limited to, fixed data rate applications where exchange of data can be scheduled and the amount of data to be exchanged is known and a single dual-net device might interface with multiple PERs. Because the dual-net device may be a regular STA in the first WLAN, it can power-down as needed without problems, unlike an access point. However, since it is also the COORD, peripheral communication could be lost if the peripheral is powered up but the dual-net device/COORD is not. This can be dealt with using mutually agreeable inactivity periods.

Figure 2:
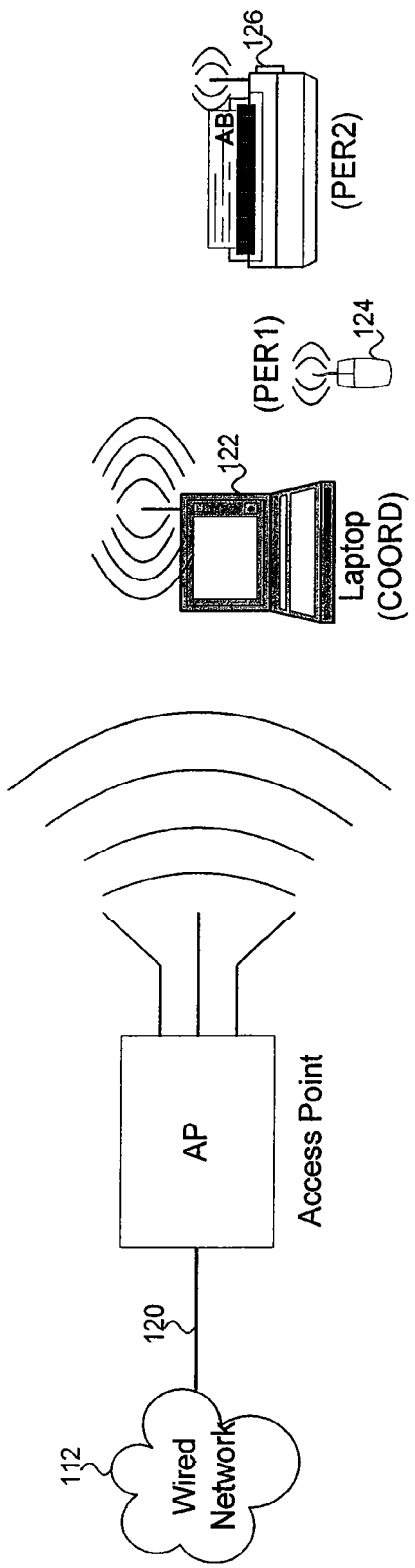
FIG. 2 is a block diagram illustrating a subpart of the elements of FIG. 1, in greater detail.

FIG. 1 shows, at a high level, the interplay among various nodes of various networks. FIG. 2 illustrates a subpart of the elements of FIG. 1, illustrating in greater detail. In this figure, AP 110 is coupled to wired network 112 via cable 120 and might communicate using any suitable wire-based networking protocol. On the other side, AP 110 transmits signals to a station device, in this case a laptop 122, using the AP's antenna and those signals are received by laptop 122 using its antenna. Signals can also flow in the other direction. Such communications would be done according to a PWN protocol, such as an 802.11x protocol.

Laptop 122 (a dual-net device in this example) in turn can communicate with the peripherals shown, in this example a wireless mouse (PER1) 124 and a wireless printer (PER2) 126. It may be that power for wireless printer 126 comes from an external power outlet, in which case power consumption might be less of a concern than with mouse 124 if it operates on battery power. Nonetheless, both peripherals might use the same power-saving protocol. Power conservation might also be performed on the dual-net device, for example, when it is a laptop.

Figure 3:
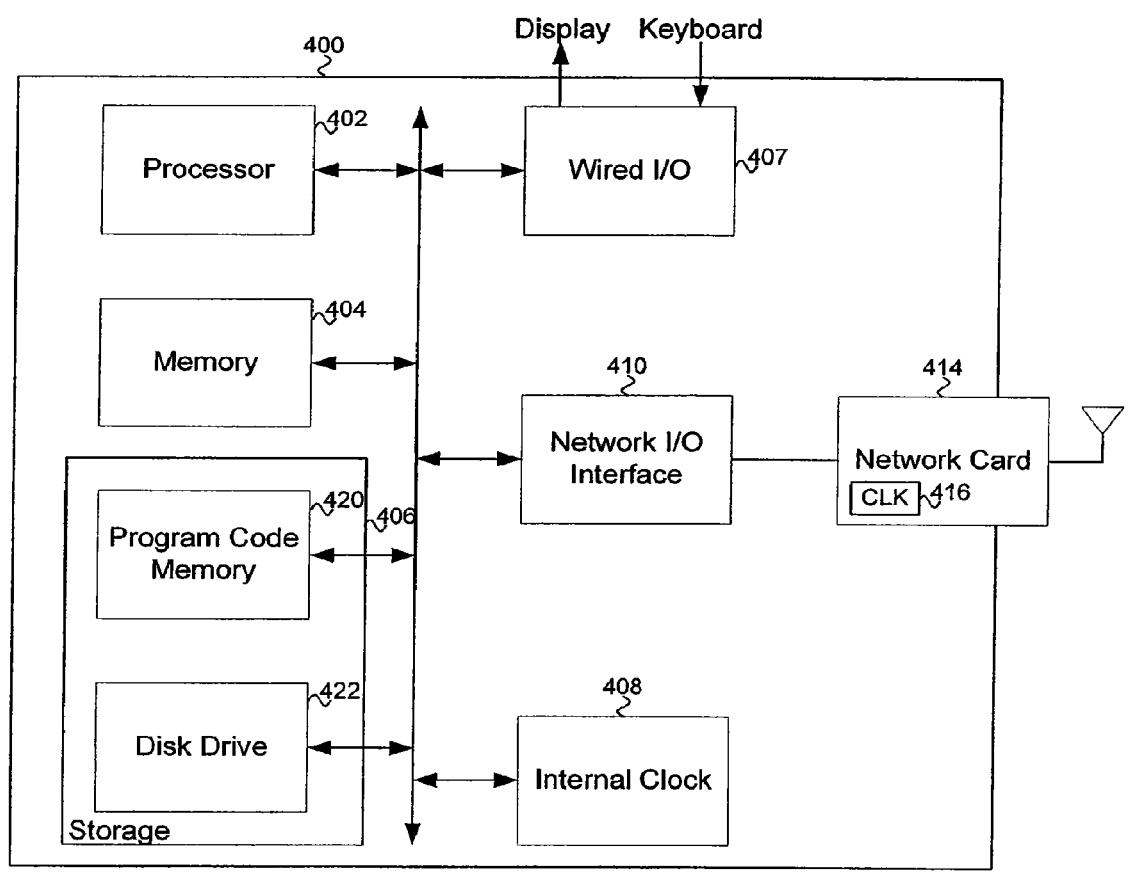
FIG. 3 is a block diagram of an example wireless PAN coordinator ("COORD").

FIG. 3 illustrates an example of the internal details of a COORD device. As explained herein, such devices might include laptops, desktop computers, terminals, MP3 players, home entertainment systems, music devices, mobile phones, game consoles, network extenders or the like. What is shown is one example. In this example, a COORD device 400 is shown comprising a processor 402, the memory 404, program and software instruction storage 406, a wired input/output interface 407 for displays, keyboards and the like, an internal clock 408, and a network I/O interface 410, each coupled to a bus 412 for intercommunication. Network I/O interface 410 is in turn coupled to a network card 414, which includes its own circuitry such as an internal clock 416 and other components not shown. In some cases, the network card is not distinct and in some cases there might not even be much hardware associated with the networking function if it can be done by software instructions.

Program and software instruction storage 406 might comprise program code memory 420 and disk drive 422. Program instructions for implementing computing, communication, etc. functions, as well as network interfacing, can be stored in program code memory 420 and might be loaded in there from instructions stored on disk drive 422. Program code memory 420 might be just a portion of a common memory that also has memory 404 as a portion. For example, both memories might be allocated portions of RAM storage so that instructions and data used by programs are stored in one memory structure. With a general purpose, network-centric, signal processing-centric or other style of processor, functional modules that might be illustrated by blocks in a block diagram might be implemented entirely in software, embodied only in code stored in computer readable media. However, when executed as intended, the processor and the stored instructions perform the functions of those modules. For example, a device might be described as having a network stack that performs certain functions, but the network stack might not be represented in individual hardware elements.

Figure 4:
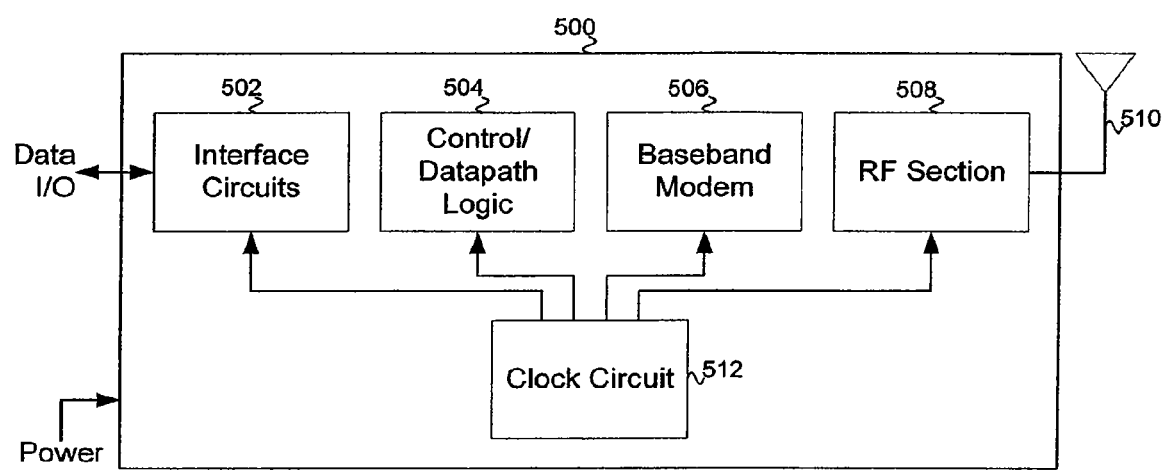
FIG. 4 is a block diagram of a network card that might be used to interface a COORD to a network.

FIG. 4 illustrates an example of a network card 500, shown comprising interface circuits 502 for interfacing network card 500 to a computing device (not shown), control/datapath logic 504, baseband modem circuitry 506, an RF section 508, an antenna 510 and a card clock circuit 512. Control/datapath logic 504 is configured to send and receive data to and from the computing device via interface circuits 502, send and receive data to and from baseband mode circuitry 506 and process that sent or received data as needed. Card clock circuit 512 might provide circuit clocking services as well as real-time clock signals to various other elements of network card 500. Note that logic elements shown and described might be implemented by dedicated logic, but might also be implemented by code executable by a processor. For example, some of the control/datapath logic's functionality may be implemented in software rather than hardware. An example processor is the ARM7 processor available from ARM Limited of London, England.

In operation of an example network card, power might be supplied via interface circuits 502 as well as providing a wired datapath for data into and out of the network card. Thus, when the connected computing device desires to send data over the network(s) supported by the network card, the computing device sends the data to an input circuit of interface circuits 502.

The input circuit then conveys the data to control/datapath logic 504. Control/datapath logic 504 may format the data into packets if not already so formatted, determine the PHY layer parameters to use for the data, etc., and possibly other processes including some well-known in the art of networking that need not be described here in detail. For example, logic 504 might read a real-time clock from card clock circuit 512 and use that for data handling or include a real-time clock value in header data or other metadata.

Logic 504 then outputs signals representing the data to baseband modem circuitry 506 which generates a modulated baseband signal corresponding to the data. That modulated baseband signal is provided to RF section 508. The timing of output of signals of logic 504 and other parts of the network card might be dictated by a timing clock signal output by card clock circuit 512. RF section 508 can then be expected to output an RF, modulated signal to antenna 510. Such output should be in compliance with requirements of nodes of the networks with which the computing device is associating.

For example, if the computing device is expecting to be associated as a node in an 802.11b network, the signal sent to antenna 510 should be an 802.11b compliant signal. Also, the control/datapath processes should process data in compliance with the requirements of the 802.11b standard. Where the computing device is expecting to be a dual-net device, the signals sent should be compliant with the protocols and/or standards applicable for the network to which the signals are directed, and be done in such a way as to deal with the fact that while communication is happening among devices of one network (such as the primary wireless network or the secondary wireless network), those signals might be heard by devices that are only devices in a different network (such as the secondary wireless network, the primary wireless network or other network) and the signals should be such that devices can at least co-exist.

Where the computing device is a dual-net device, its network card would provide signals for the primary network and the secondary network. In one example mentioned herein, the primary network is an 802.11x network and the computing device is a STA node for that network and the secondary network is a PAN and the computing device is the COORD for that network. In some implementations, network communications are handled using a software platform that supports network applications.

Figure 5:
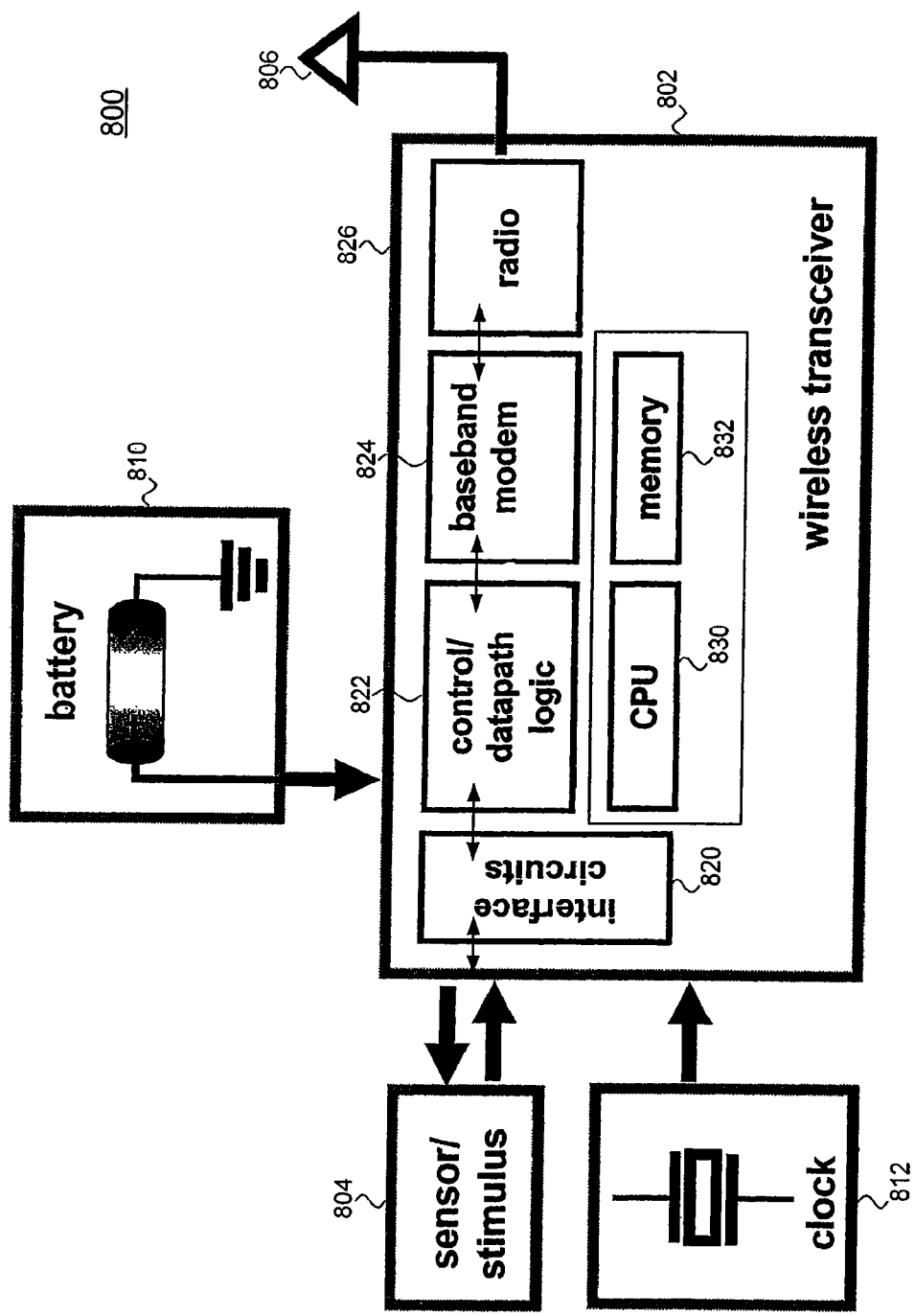
FIG. 5 is a block diagram of an example of a PER device that might get paired with a COORD.

FIG. 5 is a block diagram illustrating an example of what might be the components of a PER device. As shown, PER 800 comprises a wireless transceiver 802 coupled to sensor/stimulus elements 804 and antenna 806. Additional components, such as a filter, a balun, capacitors, inductors, etc., may be present between wireless transceiver 802 and other elements. Generally, wireless transceiver 802 allows other networked devices to understand results of sensing (in the case of a PER that does sensing, such as a mouse, microphone, remote condition sensor, etc.) and/or to specify stimulus (in the case of a PER that outputs visual, audio, tactile, etc. outputs, such as a printer, headset, etc.). It should be understood from this disclosure that PER can be a wireless input and/or output device and in many cases, the wireless transceiver can be designed independent of the particular input and/or output.

FIG. 5 also shows a battery 810 and a clock circuit 812. Battery 810 provides power for wireless transceiver 802 and elements 804 as needed. As weight and portability are likely to be important in the design of the PER, battery consumption will often have to be minimized for a good design. Clock circuit 812 might provide real-time clock signals as well as providing circuit timing clock signals.

As shown, wireless transceiver 802 comprises interface circuits 820, control/datapath logic 822, a baseband modem 824, and an RF section 826. Control/datapath logic 822 might be implemented with circuitry that includes a central processing unit (CPU) 830 and memory 832 for holding CPU instructions and variable storage for programs executed by CPU 830 to implement the control/datapath logic. Control/datapath logic 822 might include dedicated logic wherein CPU 24 and memory module 25 implement the portion of the communication protocol that is not implemented in the dedicated control and datapath logic. The CPU instructions might include digital signal processing (DSP) code and other program code. The other program code might implement MAC layer protocols and higher-level network protocols.

Clock circuit 812 might include a crystal oscillator. Clock circuit 812 might be aligned with clocks in other network devices, but the clocks may drift over time relative to each other.

Although not shown, other components like capacitors, resistors, inductors, filters, a balun, a Transmit/Receive (T/R) switch, an external power amplifier (PA) and an external low-noise amplifier (LNA) may also be included in PER 800.

Wireless transceiver 802 might be configured so as to communicate over the physical layer (PHY) of a standard IEEE 802.11-compliant circuit chip. Wireless transceiver 802 may be an embedded System-on-Chip (SoC) or may comprise multiple devices as long as such devices, when combined, implement the functionality described in FIG. 5. Other functionality, in addition to the functionality of FIG. 5 may also be included. Wireless transceiver 802 might have the ability to operate, for example, in the unlicensed 2.4-GHz and/or 5-GHz frequency bands.

Scanning for Device Detection

The present disclosure describes a scanning method for device detection in a communication system. In the disclosed method, a device responding to a probe request packet may bypass some or all of the regular medium access procedures typically imposed by the communication system without causing collisions or interference on the medium. In some of the disclosed methods and apparatus, a probing and/or listening device maintains parameters. Use of such parameters to intelligently initiate a scan may reduce the time needed to successfully complete the scan. A device may have obtained such parameter information during a previous connectivity state.

In embodiments of communications systems described herein, signals are conveyed between devices using processes wherein devices (often two of the devices) establish a connection between themselves such that they are ("in sync",) e.g., one device understands that it is to transmit while the other understands it is to receive and both devices understand, to the extent necessary, the common communications parameters to be used for the transmission/reception. Parameters might include the current time (useful in situations where not all devices have the exact same clock at all times), channel selections, data rate, protocols, etc. Note that some of the parameters might be such that they cannot, or should not, be maintained during periods of inactivity. For example, keeping clocks of separate devices in sync constantly might take more effort (computing power, bandwidth, electrical power, etc.) than syncing up as needed. As another example, if those devices reserved a channel exclusively for themselves, but rarely used it, that would tend to waste resources. Of course, in some variations wherein synchronization is not needed (e.g., where one of the devices is on all the time and maintains an official time base), connections might still need to be established prior to data transfer.

In view of these considerations, there is a difficult balance to be struck, between maintaining everything in place for quick transmissions and being efficient with use of power and capacity. Apparatus and methods described herein provide improvements that allow for low-latency transmission of information/data/signals without requiring maintenance of connections over long quiescent periods.

In a typical operation, when an initiating device desires to exchange information, data and/or signals with a destination device, it sets up a connection, which might involve device detection (wherein one device determines whether the other device is present), negotiation and/or exchange of specific communication parameters and/or security information (after it is determined at each device that the other device is present), and initiation of a synchronization procedure (as needed). Parameters might include an indication of the channel to use. Device detection by the initiating device typically involves a scanning operation to locate the channel of the destination device. While it is typical that the initiating device begins the scanning operation and most examples herein do assume that the initiating device will be the probing device beginning the scanning operation, it might be possible to have the destination device be the probing device.

Some of the parameters might need to be agreed upon each time a connection is set up. For example, where the devices do not have synchronized clocks (and the clock drift outside of a connection is expected to vary enough to require synchronization), the devices might need to agree on a parameter that represents a current time. On the other hand, even devices that do remain in sync might have other parameters to set up.

Other parameters can be agreed to in advance and used for each connection. For example, a cell phone headset and a cell phone body might agree (in a "pairing" process) to use a particular data rate, addresses and protocols for each future communication session (unless the pairing is undone or the devices agree to change these parameters), and the identity of the network being used.

Parameters that are pairing parameters are typically those that would not be expected to change from connection to connection, in contrast to parameters such as which channel to use and what time it is. Where the communication system includes channels that fade, channel availability might change from time to time even if devices could reserve a particular channel.

The probing device is the device that first sends a signal to set up a connection and a listening device is a device that waits for a signal from a probing device. In most of the examples herein, the signals are in the form of packets, but other variations are possible. Thus, in an example communications system, the probing device transmits a probe request packet, which is picked up by one or more listening devices. Note that a particular device can be a probing device in one instance and a listening device in another instance.

A listening device determines whether the probe packet is directed to it and if so, responds with a probe response packet. To avoid delays in connection set-up, the listening device sends the probe response packet within the fastest possible response time or within the fastest response time that is acceptable within the communication system. Alternatively, different response times may also be used, but in any case, the listening device may bypass some or all of the regular medium access procedures, and as such may decrease the overall probe response time and possibly reduce its timing uncertainty.

Example State Diagram

Figure 6:
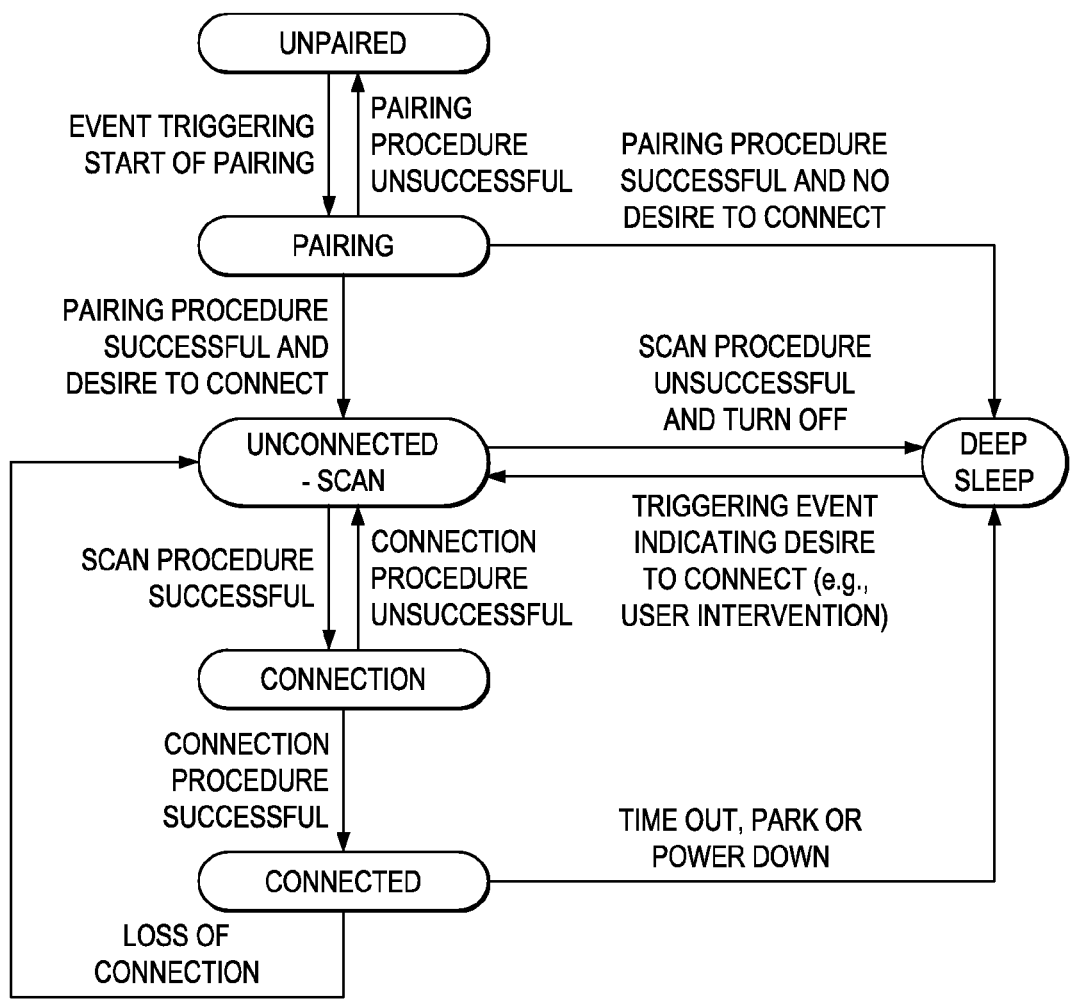
FIG. 6 is a state diagram illustrating an example of possible connectivity states of a device in a communication system that uses scanning methods described herein for device detection.

FIG. 6 is a state diagram illustrating an example of possible connectivity states of a device in a communication system that uses scanning methods described herein for device detection. This example is a specific embodiment and it should be apparent to one or ordinary skill in the art, after review of this disclosure, how other state diagrams could be implemented in such devices.

In the example shown, there are six states, labeled "Unpaired", "Pairing", Unconnected-Scan", "Connection", "Connected" and "Deep Sleep". The possible transitions between states in this example are shown in the figure by arrows and in most cases, the arrows are labeled with the event, condition or trigger that results and/or causes a state transition. These states might be physically represented by stored variables within a device and those stored variables might be read by hardware or a processor executing software to alter the operation of the device consistent with its current state.

In the Unconnected-Scan state, the device uses the scanning method described herein, and might make use of parameters and other information exchanged during a preceding state. As an example, if the device enters the Unconnected-Scan state from the Pairing state, it may use parameters and/or information exchanged during the Pairing state. Such parameters and/or information may include, but are not limited to the media address of a to-be-detected device. Similarly, if the device enters the Unconnected-Scan state from the Connected state, it may use parameters and/or information exchanged during the Connected state. Such parameters and/or information might include, but are not limited to information about the channel on which the to-be-detected device might be found.

An example of a set of transitions through the state diagram of FIG. 6 will now be described. When a device is first introduced to a network, it might be in the Unpaired state. After the device is in use, it might also go back to the Unpaired state (through a transition not shown), if some other devices are reinitialized or reconfigured. In the Unpaired state, a device will try to pair up following a triggering event. If successful, the device enters the Pairing state. If unsuccessful, the device returns to the Unpaired state. In some embodiments, once a pairing occurs following, for example, a probe request and a probe response, paired devices might remain paired by remembering parameters of the devices and the pairing.

If pairing is successful, the device transitions to the Unconnected-Scan state, or the Deep Sleep state if it is determined that there is not current need to connect. If there is a need to connect, the transition from the Unconnected-Scan state to the Connecting state occurs. At this point, a probing device might start a scan processing and send out probe request packets. If connection attempts fail, the device returns to the Unconnected-Scan state, otherwise it transitions to the Connected state. In this state, typical data can be transferred. If the connection is lost, the device transitions to the Unconnected-Scan state. If the devices determine that no further transfers are needed, a timeout occurs, or other conditions occur, the device transitions to the Deep Sleep state.

Other variations should be apparent after reading this disclosure.

Example Hardware

Figure 7:
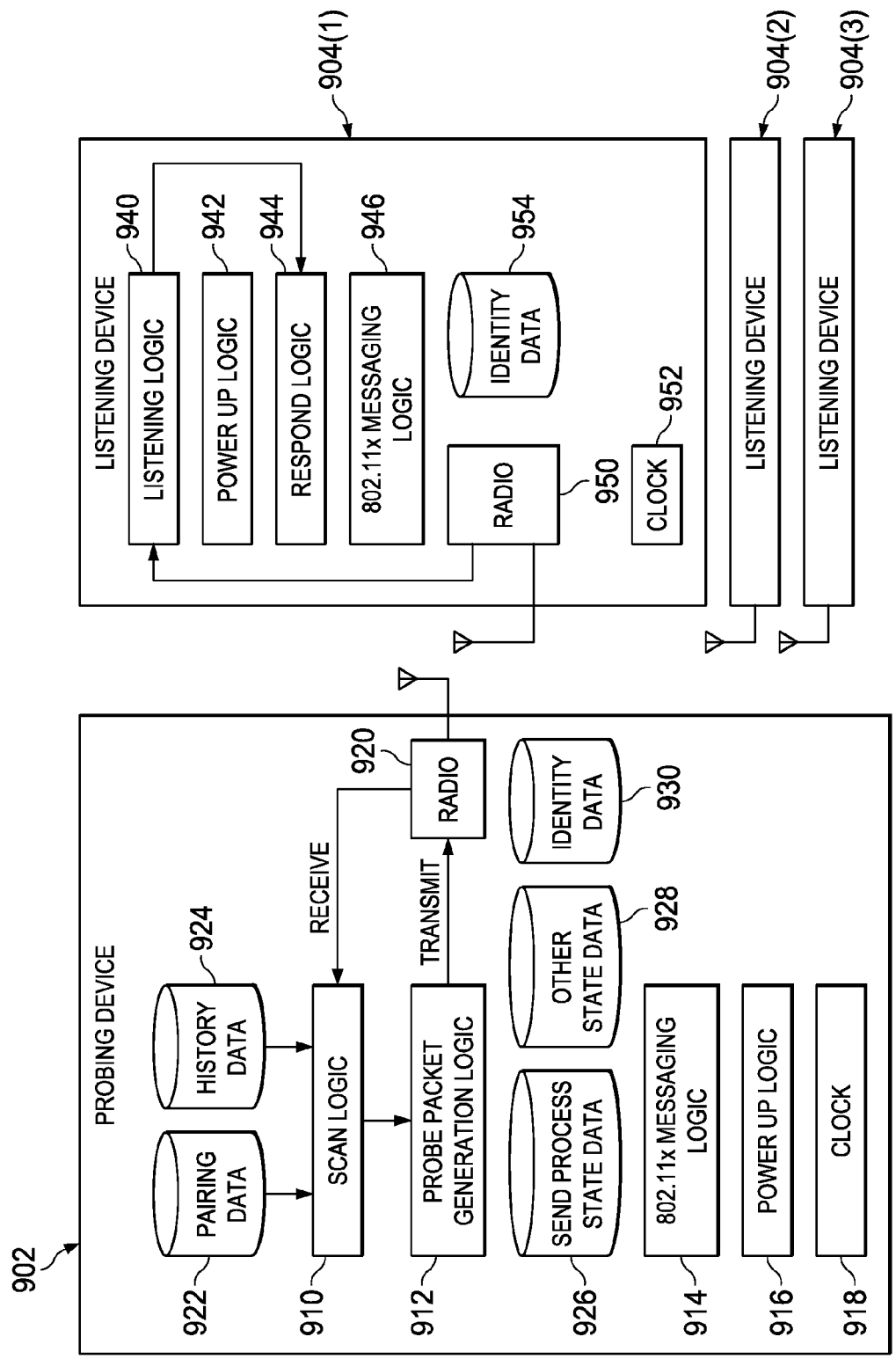
FIG. 7 is a block diagram illustrating elements of an embodiment of a probing device and a listening device.

FIG. 7 is a block diagram illustrating some elements that might be present in a probing device and a listening device. As has been explained, a given device might be a probing device sometimes and a listening device at other times, so the elements of both types of devices in the figure might be present in a given device. In addition, other elements might also be present, such as other elements described as being elements of an initiating device and/or a destination device.

In FIG. 7, one probing device 902 and three listening devices 904 are shown, with listening device 904(1) shown in greater detail. While the description below describes distinct data elements and logic elements, it should be understood that these devices might be implemented with several data elements combined into a single memory structure and the logic might be separate or combined logic, implemented with circuitry, logic gates, gate arrays, instructions in a code memory executable by a processor, or the like or combinations thereof. In addition, other logic and/or data, supporting or independent, might be present as well.

Probing device 902 is shown comprising scan logic 910, probe packet generation logic 912, 802.11x messaging logic 914, power-up logic 916, a clock circuit 918, a radio 920, storage for pairing data 922, storage for history data 924, storage for send process state data 926, storage for other state data 928, and storage for identity data 930. Scan logic 910 might perform calculations for determining which scan step to perform, whether to continue scanning, etc. according to steps described elsewhere herein. Probe packet generation logic 912 generates the appropriate packets and radio 920 transmits them. Of course, elements of radio 920 might include digital signal processing elements. 802.11x messaging logic 914 is usable for handling 802.11 packets transmitted and/or received, power-up logic 916 is usable for determining when and what to power-up and power-down for efficient power usage. Clock circuit 918 provides various logic elements with time information as well as clocking circuits, as needed. Pairing data is used by some logic elements to determine which listening devices are paired, which were paired, etc. History data is usable to initiating a scan sequence and for optimizing the scan/search process. Send process state data is usable for tracking where the probing device is in the scanning process. Identity data 930 is usable to uniquely identifying the probing device. Identity data 930 might be a memory location wherein a unique identifier of the probing device, such as its MAC or pseudo-MAC address, is stored. This might also be hardwired for the device.

Where some or all of a set of digital signal processing elements and/or logic steps are performed by a device, they might be performed by a processor executing instructions from a stored code memory wherein the instructions embody the functionality of the elements and/or steps.

Listening device 904(1) is shown comprising listening logic 940, power-up logic 942, respond logic 944, 802.11x messaging logic 946, radio 950, clock circuit 952, and storage for identity data 954. Many of these elements operate as their counterparts in the probing device and some of the elements with different reference numbers might be the same elements depending on usage. For example, where a device is a probing device at some times and a listening device at other times, clock circuits 918 and 952 would simply be one clock circuit.

Respond logic 944 is usable to determine how and when to respond to a received probe packet. Where listening logic determines that a probe packet is received, it might convey to the respond logic information about the probe packet, such as the identity of the listening device to which the packet is directed. The listening logic can compare that identity to the device's own identity, readable from storage 954, to determine whether or not to respond. Respond logic 944 might also include logic to determine when to respond and how to comply with network protocols so that listening device 904 only responds when appropriate for the network.

In certain embodiments, devices use a medium reservation scheme to reduce the probe response time. For example, when the listening device transmits a probe request packet, it might also reserve the medium for a subsequent probe response packet to be transmitted immediately or shortly after the transmission of such probe request packet. In effect, the probing device can reserve the medium for a listening device without being connected to the listening device in a session, or even without knowing whether the listening device is present.

The probe request packet may reserve the medium for a duration that equals or exceeds the duration of the probe response packet plus any possible probe response time. Alternatively, the medium reservation may only cover a fraction of the duration of the probe response packet and the applicable probe response time. Because the medium has already been reserved at that point, the device sending the probe response packet may bypass some or all of the regular medium access procedures, such as medium contention. The medium reservation may furthermore be implicit or explicit.

Non-idealities in the system may introduce a delay between the reception of a probe request packet and the transmission of a probe response packet. Such delay should be included in the medium reservation. An example of a system non-ideality is a non-zero receiver-to-transmitter response time inside the listening device. In any case, such delay is typically much less than the delay that may be incurred when following the regular medium access procedures. Methods described herein can therefore significantly reduce the probe response time, and make it less variable over time, thereby enabling faster and more power efficient device detection.

Methods described herein may be used in communication systems that deploy an asymmetric reservation scheme. An asymmetric reservation scheme is a scheme wherein only one of two communicating electronic devices has the ability and/or authority to make medium reservations. Possible reasons for deploying an asymmetric reservation scheme may include, but are not limited to, (1) one of the devices lacks some or all of the information about other devices to be able to make a correct and fair decision about when to transmit, (2) one of the devices does not have a reliable communication path to all other devices that may be sharing the same medium, (3) one of the devices does not implement medium reservation functionality, or (4) central network coordination is desirable for better network efficiency. A combination of the some or all of the above reasons, or other reasons, is also possible.

In one scheme, a probing device reserves the medium for the duration of a possible subsequent probe response packet and applicable probe response times. The medium reservation may be implicit or explicit, and may be made before, at or after the actual time of a probe request packet transmission. In addition, the medium reservation may cover the entire duration of the probe response packet and applicable probe response time, may exceed the actual duration of the probe response packet and probe response time, or may only cover a fraction of the duration of the probe response packet and probe response time. The latter may be useful if the medium reservation is specifically used to prevent other traffic from colliding with the start of the probe response packet, but the listening device can make its own medium reservation with its probe response packet once it has access to the medium.

An example of an implicit medium reservation would be a communication system where a probe request packet is automatically recognized as such by other devices that may or may not be part of the same communication system. Well-behaved devices detecting a probe request packet not addressed to them will not access the medium during a specific period of time that is allocated (by the communication system) for a subsequent probe response packet. The definition of such time period could, for example, be computed based on the time of the probe request packet, but other definitions are also possible.

An example of an explicit medium reservation scheme would be a communication system wherein every probe request packet includes information (for example in the packet header) on the duration for which it reserves the medium.

Furthermore, the medium reservation for the probe response packet is scheduled in a way that allows a probe response packet to be transmitted immediately or a reasonably short time after the transmission of the probe request packet. As explained herein, this can eliminate or significantly reduce the delay and/or timing uncertainties that may be introduced by typical medium access procedures.

The medium reservation may be exact or approximate, and may in addition to an allocation for the transmission of a probe response packet also include an allocation for one or more packet exchanges following the probe response packet. An approximation may be desirable or necessary if the device transmitting the probe request packet has no firm knowledge over the exact probe response time or does not have the ability and/or information to exactly calculate the exact medium allocation requirement for the probe response packet. The reservation of the medium for subsequent packet exchanges may further decrease the time required to connect since it allows bypassing some or all of the regular medium access procedures for transmission of those frames.

Various processes and/or rules can be used by probing devices to determine which channel(s) to probe on and by listening devices to determine which channel(s) to listen on.

One process is to scan all applicable channels with equal weight and without giving priority to specific channels. As an example, a scan process might comprise subsequently scanning all channels in order of increasing channel number and repeating this operation until the destination device has been detected. In another process, historical values for parameters might be used to initialize a scan to possibly reduce the time needed for a scan. For example, if any probing device is to scan a plurality of channels, it might start the scanning process with a channel that is known, historically, to have been used by the listening device of interest.

In many of the examples herein, the destination device is known to exist and thus its existence is assumed. For example, if a wireless mouse has been paired with a laptop computer, when the mouse needs to transmit movement to the laptop, it assumes that the particular laptop exists and tries to detect it. As another example, when a cell phone headset is paired with a cell phone body, it tries to detect that particular body. It may be that other similar devices are present in the area as listening devices, but communication with those devices is not useful in these situations and the absence of the paired device will typically make any communication useless. Thus, if a wireless mouse discovers the presence of an access point, a second computer, a cell phone, all of which are on the same communication system, such as a wireless LAN or PAN, none of those connections would be useful when the wireless mouse needs to convey mouse movements to its paired laptop. As a result of these assumptions, the processes can assume that the destination device will be found (otherwise, the probing device can just give up, as nothing else can be accomplished).

An alternative process might be used, that can be more efficient, but more involved. For example, the devices might take into account the knowledge of channels at which device detection has been successful in the past and favor those channels. Alternatively, the detection on specific channels of a higher medium occupancy in general or particular traffic in particular, may be used to give these channels a different weight and/or priority over other channels. As an example, if channels are defined based on frequency, then the detection of traffic in general, or traffic with specific information (e.g., matching values of certain address fields) in particular on a specific frequency may be an indication that a communication system is operating on that frequency and may trigger a more frequent scan of the particular frequency. As a very specific example, if the destination device is operating on a fixed frequency, and on a specific frequency, the initiating device detects unrelated traffic that is addressed to the destination device or is coming from the destination device, that might serve as an indication that the destination device is operating on that frequency.

In addition, a destination device may keep a local list of acceptable channels. This list contains channels that the destination device is allowed to be operating on (e.g., subject to regulatory constraints). An example is a communication system where a channel is defined based on frequency and the available spectrum may vary by country, region or may be confined to a reduced set by a user of network administrator. In such a communication system, the destination device may keep a list indicating which frequencies it is allowed to be operating on given its geographical location or local environment. The destination device may communicate this information to a listening device during an established connection.

The listening device can include that information in determining the weight and priority of specific channels during a later scan.

In order to minimize the overhead and/or conserve power inside the listening device, listening intervals may be combined with or aligned to the execution of other functionality. As an example, if a listening device also is exchanging information with one or more other devices, it may decide to align some or all of its listening intervals to the time of information exchange with those other device or devices.

In a more specific embodiment, the communication system is an 802.11-compatible Wireless LAN or Wireless PAN system (such as 802.11a, 802.11b, 802.11g, etc.). An example of such a network is a Wireless Local Area Network (WLAN) based on an 802.11x specification. Another example is a Wireless Personal Area Network (WPAN) that is based on an 802.11x specification, which may or may not be fully compliant with such protocol.

Such network may, for example, use 802.11x frame formats and modifications and/or extensions thereof. Yet another example is a wireless PAN where the destination device of the wireless PAN implements an 802.11x specification, and may or may not be associated with a different wireless LAN at the time of scan by the initiating device in its wireless PAN. One example is a network as described in U.S. Published Patent Application No. 2006/0227753, published Oct. 12, 2006, which is commonly assigned with the present application, the disclosure of which is incorporated herein in its entirely for all purposes.

Figure 8:
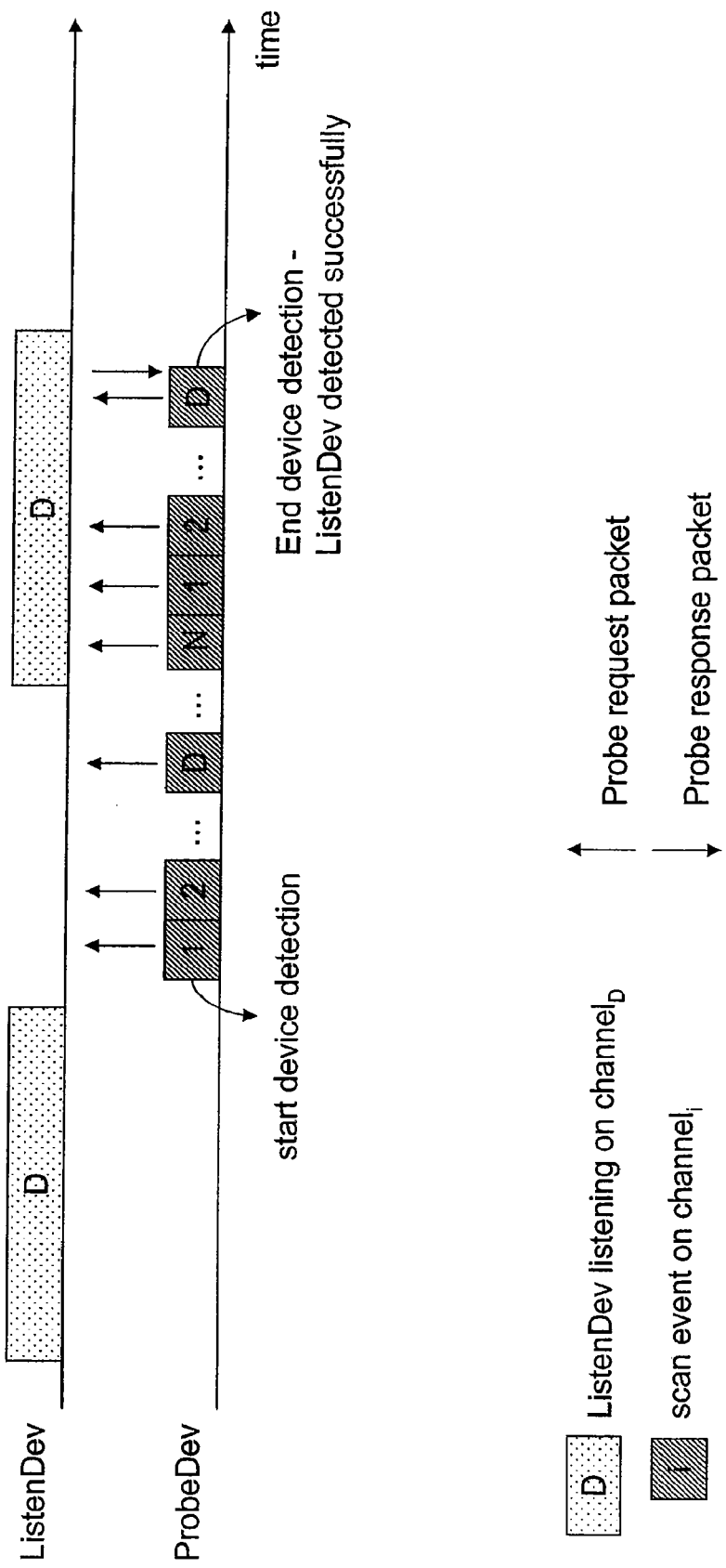
FIG. 8 is a timing diagram illustrating a scanning method for device detection wherein a destination device is a listening device and an operating channel of the destination device is unknown to the initiating device.
Figure 9:
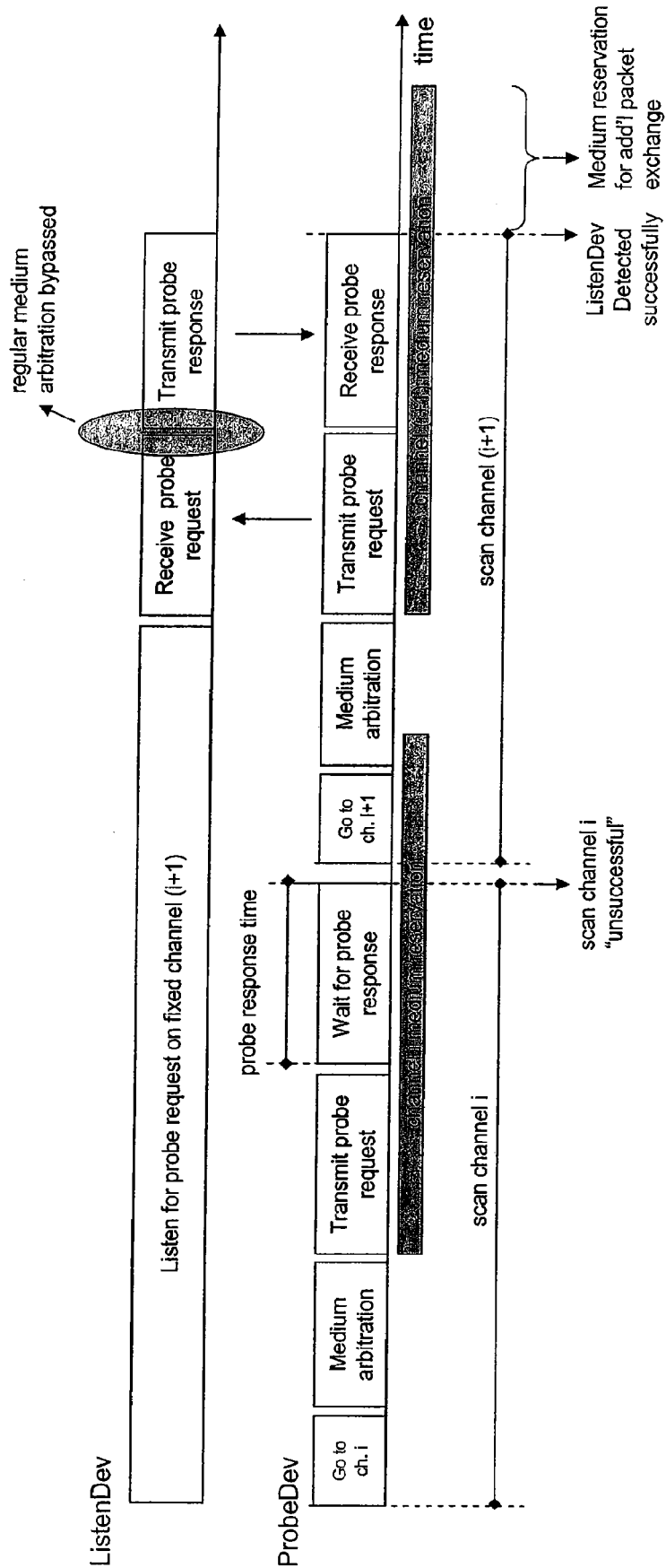
FIG. 9 is a timing diagram illustrating operations and packet exchange for the scanning method illustrated in FIG. 9.

FIGS. 8-9 illustrate one specific embodiment of the invention. In that embodiment, the communication system is a wireless network based on CSMA/CA (e.g., an 802.11-based wireless network). In the figures, a probing device is labeled "ProbeDev" and the listening device is labeled "ListenDev". It should be clear to one skilled in the art upon reading this disclosure that the scheme presented in FIGS. 8-9 is only an exemplary embodiment and that numerous modifications are possible and are at least suggested by this disclosure.

In the embodiment shown, the listening device periodically (or at least sufficiently frequently in time) listens for a probe request packet from a probing device that may be trying to connect with the listening device. The listening periods are illustrated by "D" on the timing diagram for ListenDev in FIG. 8. Assume that the listening device listens on a single channel (e.g., defined by frequency), and that this channel is not a priori known to the probing device.

When the initiating device desires to exchange information with the destination device, it may perform one or multiple scan events. A probe is initiated by a probing device, typically the initiating device. A typical scan event at the probing device comprises (1) going to the selected channel to be scanned, (2) transmitting a probe request packet with extended medium reservation on the scan channel, and (3) listening for a probe response packet on the channel where the probe response packet is expected.

If no probe response packet is received within the specified probe response time, the probing device moves to the next channel to be scanned and repeats the same procedure. The probe response time may, for example, be equal to one Short Interframe Space or one "SIFS" but other probe response times are also possible. In a variation where the communications system allows overlapping, the probing device may begin sending a second probe request packet on a second channel while waiting for a probe response packet on a first channel.

Scan events may be repeated until the listening device is detected or a timeout is reached. It may be necessary that the same channel is to be scanned multiple times before listening device detection is successful. Note that in the example shown in FIG. 8, the probing device does send a packet to the listening device, but the first time, the listening device is not listening.

Listening device detection can be defined as the successful reception of a probe response packet from the listening device, but other definitions are also possible.

An inactivity time may be implemented in between scan events inside the device sending probe request packets. As an example, if the probing device does not receive a probe response packet within the specified probe response time, it may decide to power down some or all of its circuitry for some time to conserve power before transmitting a probe request packet on the next channel. Alternatively, the probing device may use an inactivity time to perform other functions.

FIG. 9 illustrates a more detailed process of probing and listening.

In a more specific embodiment, the network is an 802.11x network or a network that uses 802.11x frame formats and extensions and/or modifications thereof, the probe request packet is a Ready-to-Send (RTS) packet, and the probe response packet is a Clear-to-Send (CTS) packet, wherein the RTS and CTS packets are used without requiring a connection between the probing device and the listening device, which is not the case in a conventional 802.11x network. Unlike in a conventional 802.11x network, where an RTS/CTS frame exchange is used during regular data transmissions as a medium reservation mechanism to overcome a hidden node problem, the RTS/CTS frame exchanges as described herein provide a power-efficient means of device detection. In a conventional 802.11x network, a STA that has data pending might decide to send an RTS packet to the AP that it is associated with as a request to the AP to reserve the WM for its pending data. The AP responds to this request by sending a CTS packet that may be heard by all devices that are within the AP's range, thereby overcoming possible hidden node problems.

Unlike in a conventional 802.11x network, the exchange described herein does not require that the network be a wireless network in an infrastructure mode or that the device making the medium reservation be an access point. Thus, the devices described herein might provide for medium reservation at the same time as probing for devices, by having the probe request be a medium reservation. Appropriately programmed or configured listening devices would be programmed or configured to look out for medium reservations whether or not the listening device is associated with any network and, depending on the content of the medium reservation, interpret that medium reservation as a probe request directed to it and respond to the probe request/medium reservation accordingly.

The use of an RTS packet as the probe request packet and a CTS packet as the probe response packet has an advantage that the device transmitting the RTS packet can at the same time reserve the medium for one or more packet exchanges following the RTS/CTS-based device detection. Indeed, by increasing the medium reservation in the RTS packet, regular medium access procedures may be bypassed in at least one and potentially multiple of the subsequent packet exchanges between the probing device and the listening device. This may speed up the connection procedure, especially if additional packet exchanges beyond device detection are required. Such packet exchanges may include, but are not limited to, the exchange and/or negotiation of specific communication parameters, the exchange of specific security information (e.g., session keys) and the initiation of a synchronization procedure.

An RTS/CTS packet exchange is typically understood by existing 802.11-compliant hardware, firmware and/or drivers. As a result, an RTS/CTS based device detection method such as one of those described herein can be readily implemented in a network where the listening device is an 802.11-compliant device and access to the hardware, firmware and/or driver of such device may or may not be available. This would allow for a probe device or a listening device to be built using 802.11x hardware with access only to higher level commands.

As an example, in a very specific embodiment, the RTS/CTS packet exchange is used as a method of device detection in a wireless PAN network where the listening device implements one or more 802.11 specification, and at the time of device detection may or may not be connected to a wireless LAN network that is based on an 802.11 specification. The listening device may be the AP of such wireless LAN network, or may be a regular non-AP STA, or maybe hardware that supports only a subset of the 802.11 protocols.

In such an embodiment, where the listening device fully implements required 802.11 protocols, a probing device sends an RTS packet to the listening device with the receiver address or "RA" set to the match the MAC address of the listening device, the transmitter address or "TA" set to match the MAC address of the probing device, and the duration field set to indicate to the listening device the duration for which a medium reservation is requested. Since the listening device implements 802.11x protocols, upon successful reception of an RTS packet, it automatically (that is without requiring special modifications to its hardware or low level firmware) responds with a CTS packet directed to the probing device within one SIFS, thus bypassing regular medium arbitration procedures.

If the probing device does not receive a CTS packet from the listening device within one SIFS, it may decide to move on to the next channel and repeat the same procedure. Upon successful reception of a CTS packet from the listening device, the probing device may send one or multiple packets to the listening device, depending on the medium reservation that was requested in the initial RTS packet.

In a closely related embodiment, packets may be used as probe packets and probe response packets that are not actual RTS/CTS packets, but have similar characteristics with regards to turnaround time (e.g., not requiring medium arbitration) and/or medium reservation.

In another embodiment, the probing device may send a probe request packet directed to the listening device it tries to detect, and may use the ACK packet generated by the listening device as the probe response packet. The packet sent by the probing device can be of any format, as long as it is directed to the listening device. As is the case with CTS packets, ACK packets can be sent without requiring a separate medium access arbitration, therefore resulting in a fast turn-around time.

Occasionally, it may happen that the listening device is listening on a frequency that is not the same as the frequency on which the probing device is transmitting, yet is still able to successfully receive the probe request packet from the probing device. As an example, if the network is based on an 802.11 specification, both devices may be operating on different yet overlapping channels, and may therefore still be able to successfully receive packets from one another. To avoid the situations wherein a probing device and listening device connect while operating on different frequencies, modulations or channels, frequency, modulation or channel identification information (e.g., signalling parameters) may be included in the packet exchange following the device detection. Alternatively, the probing device may repeat the device detection procedure on multiple channels or frequencies (e.g., on frequencies that are adjacent to the frequency on which device detection was successful), measure the signal strength of the probe response packet and/or one or more other parameters that may be used as an indicator of link quality, and connect to the listening device on the channel or frequency that corresponds to the highest link quality.

Other variations are also possible, wherein an initiating device transmits to a destination device after a probing device detects a listening device. Furthermore, while in the specific embodiments described herein the initiating device acts as the probing device and the destination device is the listening device, the reverse might also be the case (i.e., wherein the initiating device is the listening device and the destination device is the probing device).

In certain communication systems, multiple initiating devices may be paired with a single destination device, and under certain circumstances, it may desirable that some or all of those initiating devices be able to establish a connection at or around the same time. An example of such communication system may be a wireless network that comprises a laptop and multiple cordless peripherals (e.g., mouse, keyboard, headset, etc.). When a user starts using his or her laptop after some time of inactivity, it is likely that the user will start using multiple peripherals at or around the same time. Although none of the system components can predict when a user will start to use its peripherals, the user will expect the application to respond in apparently real-time (i.e., without noticeable delay, undesirable delay, or both) even if multiple peripherals have to be connected at or around the same time.

In order to accommodate the connection of multiple peripherals without incurring additional latency, a destination device that has multiple paired initiating devices, upon receiving a request for connection by, or after having established, a connection with a first initiating device will enter a higher activity scan state for other paired initiating devices that may be trying to connect. In one example of a higher activity scan state, the destination device keeps its circuitry powered on continuously for some time after receiving a connection request and/or establishing a connection with one device to speed up the device detection by other initiating devices. Alternatively, the destination device wakes up its circuitry more frequently or for longer periods of time at a time compared to its normal scan state. Other implementations of a higher activity scan state are also possible.

The apparatus and methods described above have many uses. But one example is communication between a host and a peripheral where the peripheral, and possibly also the host, need to conserve battery power, such as the use of a wireless mouse, wireless printer, wireless interface and/or "dongle"

with a laptop, a cell phone-headset, a cell phone-PDA, music player-headset, or other device communications wherein it can be expected that one of the devices has to conserve limited power, typically because its size/weight dictates limits on battery charge available.

One common approach to battery conservation is to shut down most circuits for a quiet period and only wake up when processing or communication is needed. When a client device wakes up after a quiet period, it will typically want to connect up with its host, to check status, inform the host of the client's continued presence, etc. Alternatively, if the host and client are so coordinated, the host might initiate the connection during a period in which the host knows that the client is expecting to be probed. In either case, without a connection present, one device can reserve a medium (using RTS/CTS packets or other methods) for another device that the reserving device knows (or assumes) to exist, so that the other device can respond to the one device without having to contend for the medium itself or perform other steps that might have been needed prior to responding.

While the present invention has been described herein with reference to particular embodiments thereof, a latitude of modification, various changes, and substitutions are intended in the present invention. In some instances, features of the invention can be employed without a corresponding use of other features, without departing from the scope of the invention as set forth. Therefore, many modifications may be made to adapt a particular configuration or method disclosed, without departing from the essential scope and spirit of the present invention. It is intended that the invention not be limited to the particular embodiments disclosed, but that the invention will include all embodiments and equivalents falling within the scope of the claims.

What is claimed is:

1. A method comprising:
   transmitting, from a probing device, a probe request packet directed to a listening device, the probing device configured to reserve a medium for a medium reservation period, the medium reservation period including an amount of time following the sending of the probe request packet that is greater than or equal to an amount of time needed to receive a probe response packet and less than an amount of time needed for the probing device to transmit a subsequent data packet to the listening device in a data session;
   receiving, by the probing device from the listening device during the medium reservation period, a probe response packet in response to the probe request packet; and
   determining, at the probing device, an existence of the listening device based on the probe response packet.

2. The method of claim 1, further comprising:
   maintaining, by the probing device, one or more parameters obtained during a previous connectivity state with the listening device; and
   initiating a scan to locate a communication channel of the listening device using the one or more parameters.

3. The method of claim 2, wherein the one or more parameters includes a communication channel that was previously used by the listening device.

4. The method of claim 3, where the probing device determines a frequency of the channel by detecting unrelated traffic that is addressed to the listening device or is coming from the listening device.

5. The method of claim 1, wherein the medium reservation period includes a delay that accounts for a response time of the listening device.

6. The method of claim 1, wherein the medium reservation period is requested by the probing device before the probe request packet is sent to the listening device.

7. The method of claim 1, wherein the probe request packet is a Ready-To-end (RTS) packet and the probe response packet is a Clear-To-Send (CTS) packet.

8. The method of claim 7, wherein the probing device and the listening device are configured to process RTS or CTS packets independent of whether a connection exists between the probing device and the listening device.

9. The method of claim 7, wherein the probing device reserves the medium with the RTS packet for one or more packet exchanges following RTS/CTS-based device detection.

10. The method of claim 1, wherein the probe response packet is received over the medium without medium arbitration.

11. The method of claim 1, wherein the probe request packet is a data packet and the probe response packet is an acknowledgement (ACK) packet.

12. The method of claim 1, further comprising:
    sending a second probe request packet on a first communication channel; and
    listening for the probe response packet on a second communication channel.

13. The method of claim 1, wherein the probing device powers down some or all of its circuitry for period of time if the probing device does not receive the probe response packet within a specified period of time.

14. A method comprising:
    receiving, by a listening device, a probe request packet from a probing device; and
    sending, by the listening device to the probing device during a medium reservation period, a probe response packet in response to the probe request packet, the probe response packet configured to enable the probing device to determine an existence of the listening device, wherein the medium reservation period is reserved by the probing device and includes an amount of time following the sending of the probe request packet that is greater than or equal to an amount of time needed to receive the probe response packet and less than an amount of time needed for the probing device to transmit a subsequent data packet to the listening device in a data session.

15. The method of claim 14, wherein the listening device reserves the medium for one or more additional packets following receipt of the probe response packet by the probing device.

16. The method of claim 14, wherein the listening device, upon receiving a request for connection from or after establishing a connection with the probing device, enters a higher activity scan state to speed up connection with additional probing devices that may be trying to connect.

17. The method of claim 16, wherein the higher activity scan state comprises extending a power-on time.

18. The method of claim 16, wherein the higher activity scan state comprises increasing a frequency of a wake-up schedule.

19. The method of claim 14, where the listening device bypasses some or all medium access procedures when sending the probe response packet or data packets.

20. The method of claim 14, wherein the listening device is configured to combine or align listening intervals to a time of information exchange with another device.

* * * * *

UNITED STATES PATENT AND TRADEMARK OFFICE
CERTIFICATE OF CORRECTION

PATENT NO. : 9,198,115 B2  
APPLICATION NO. : 14/473631  
DATED : November 24, 2015  
INVENTOR(S) : Katelijn Vleugels et al.

It is certified that error appears in the above-identified patent and that said Letters Patent is hereby corrected as shown below:

Claims

Column 22, Line 5; In Claim 7, delete "Ready-To-end" and insert -- Ready-To-Send --, therefor.

Signed and Sealed this
Twenty-second Day of March, 2016

Michelle K. Lee
*Director of the United States Patent and Trademark Office*